Figure 1:
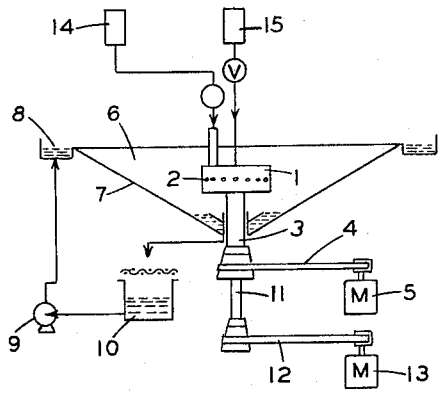

INVENTORS
JOHN W. BAYMILLER
WALTER J. BOHRN
WILLIAM A. MOGGIO

BY *Theodore L. Thomas*

ATTORNEY

United States Patent Office 3,293,695
Patented Dec. 27, 1966

3,293,695
ENCAPSULATING APPARATUS
John W. Baymiller, Manheim Township, Lancaster County, Pa. (1708 Lititz Pike, Lancaster, Pa. 18504); Walter J. Bohrn, Manor Township, Lancaster County, Pa. (2107A Plymouth Road, Lancaster, Pa. 18504); and William A. Moggio, 433 Spring Drive, Millersville, Pa. 18508
Filed June 9, 1964, Ser. No. 373,816
3 Claims. (Cl. 18—2.6)

This invention relates generally to apparatus for encapsulating a filler material in an encapsulating medium. More particularly, the invention relates to an improvement in apparatus for forming filled capsules by means of a centrifugal multi-orifice forming head.

U.S. Patent 3,015,128—Somerville, assigned to Southwest Research Institute, issued January 2, 1962, describes in detail a successful centrifugal encapsulating apparatus comprising a rotating, orifice-containing forming head, a rotating disk for delivery of filler material to the orifices, and accessory equipment. The disclosure of U.S. 3,015,128 is hereby incorporated herein by reference.

Although the apparatus described by that patent functions well, improvement is desirable. Referring to FIG. 6 of the patent, it can be seen that line 37d used to deliver encapsulating medium for forming the walls of the capsule protrudes into the paths of the discrete particles 48 of filler material in their travel toward the encapsulating orifices 25. Accordingly, filler material strikes the tube 37b, drips down its length, and contaminates the encapsulating medium to an extent which is sometimes undesirable.

To overcome this shortcoming by removing the delivery tube from the path of the filler material, FIG. 10 of the patent shows tube 37b coming up from the bottom of the forming head or cylinder 16. Centrifugal action of the cylinder 16 then forces the encapsulating medium outward, then upward and outward through spaced arms 59. The encapsulating medium must then flow up the sides of the cylinder 16 to the orifices 25. However, it has been found that this feed system leaves something to be desired in high-capacity production. The orifices are starved for encapsulating medium and cannot maintain the maximum capsule-making capacity of which the apparatus is capable.

Accordingly, there is a need for an improvement in the apparatus to increase production rates.

It is the primary object of the present invention to supply such an improvement. It is another object of the present invention to supply a modified apparatus which will allow increased encapsulating rates without contaminating the encapsulating medium with filler material.

These objects have been accomplished in an effective, straight-forward, and relatively simple manner. The invention contemplates using as a means for impelling a filler material into the orifices of the cylindrical forming head an impelling disk in the shape of an annulus. A plurality of spokes support the annulus, the spokes being mounted on the means for rotating the annular impelling disk at a position below the plane of the disk. Means for delivering the encapsulating medium through the center opening in the annulus and through the mounting spokes to the bottom of the cylindrical forming head is then provided.

The invention will be better understood by referring to the drawings in which

Figure 2:
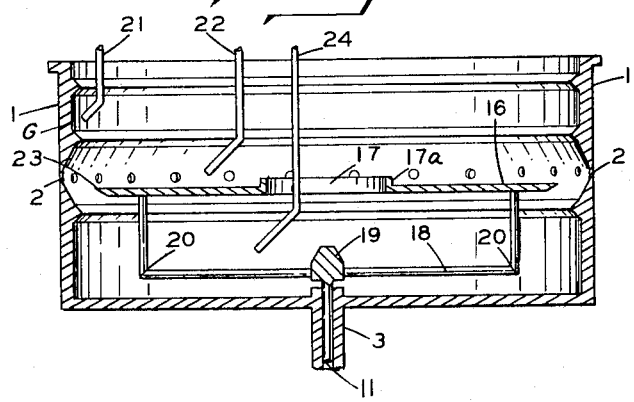
Figure 3:
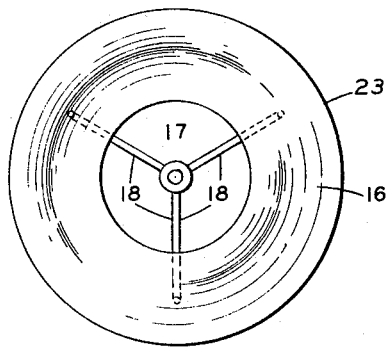
Figure 4:
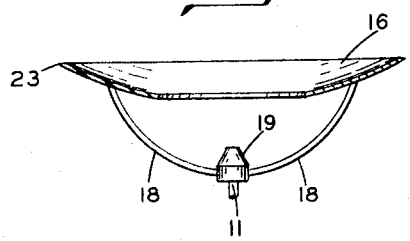

FIG. 1 illustrates generally the features of a centrifugal encapsulating apparatus, FIG. 2 illustrates in cross section the novel features of the rotatable cylinder and the annular impelling disk of the present invention, FIG. 3 is a simplified plan view of the rotating, annular, disk impeller to be used in the apparatus of the present invention, and FIG. 4 is a simplified cross section of a disk impeller having a modified shape.

Referring to FIG. 1, the rotating cylinder 1 containing the orifices 2 is driven by means of rotating shaft 3 and belt 4 by the motor 5. Capsules formed at the orifices 2 drop into the hardening bath 6 contained in the shell 7 having an overflow feed channel 8 which delivers the hardening bath 6 by means of the pump 9 from the recycling container 10. Inside the rotatable cylinder head 1 is an impeller, not shown, driven by the rotating impeller shaft 11 by belt 12 which in turn is driven by the motor 13.

The filling material container 14 delivers filler, or material to be encapsulated, while the encapsulating medium container 15 delivers the material from which the wall of the capsule is to be made.

In FIG. 2, the rotatable cylinder 1, the orifices 2, and the shaft 3 correspond to similar parts shown in FIG. 1. The impelling disk 16 is in the shape of an annulus having a center opening 17 and an optional shoulder 17a. Spokes 18 support the impelling disk 16 at the top 19 of the impelling disk rotating shaft 11. Although the spokes 18 are shown in FIG. 2 as having a right angled bend at 20, the right angled bend 20 is merely for convenience. The spokes 18 may be of any convenient shape to support the impelling disk 16, and may even be straight spokes from the shaft top 19 to the impelling disk 16, although such is not generally convenient. The encapsulating medium feed tube 21 deposits feed in the top groove G of the rotatable cylinder 1. The filler feed tube 22 deposits material to be encapsulated on the impelling disk 16. It is apparent that the filler material is spun off the impeller disk 16 into the orifices 2 without striking any other object such as a feed tube suspended between the outer edge 23 of the impeller disk and the orifices 2. The center encapsulating medium feed tube 24 protrudes through the center opening 17 of any convenient size to accommodate the tube 24 and deposits additional encapsulating medium on the bottom of the rotatable cylinder 1. Due to the rotation of the rotatable cylinder, the encapsulating medium travels outwardly across the bottom of the cylinder 1, eventually flowing into the orifices 2. This center feed feature of the apparatus of the present invention allows the free flow of encapsulating medium to the orifices 2 from a region beneath the orifices 2 without having to flow through restrictive openings as in FIG. 10 of the above-described U.S. 3,015,128. The impelling disk 16 in the shape of an annulus allows increases in production capacity of the encapsulating apparatus by as much as 200%. Although FIG. 3 shows the use of three spokes 18, two or four or more may be used as desired, taking into account the needed rigidity and strength of the rotating impeller disk in the particular apparatus. The impelling disk 16 shown in FIG. 2 is illustrated as a flat annulus mounted above the shaft top 19 of the rotating impeller shaft 11. The impeller disk 16, however, may be slightly curved as shown in FIGS. 3 and 4. This feature compensates to some extent for minor variation in the flow of the filler material through the feed tube 22.

We claim:
1. In a centrifugal encapsulating apparatus for encapsulating a filler material in an encapsulating medium, the apparatus comprising a rotatable cylinder having a plurality of spaced encapsulating orifices, means for delivering an encapsulating medium to said orifices, impinging means rotatably mounted in said cylinder to impel a filler material into said orifices, means for delivering a filler material to said impinging means, and means for rotating said impinging means and said cylinder at desired speeds, the improved impinging means comprising an impelling disk in the shape of an annulus, a plurality of spokes supporting said disk and mounted on said rotating means for said disk at a position below said disk, and means for delivering said encapsulating medium to the bottom of said cylinder through the center opening in said annular impelling disk.

2. Apparatus according to claim 1 wherein said impelling disk is mounted on three spokes.

3. Apparatus according to claim 1 wherein said spokes have a right angled bend therein.

References Cited by the Examiner

UNITED STATES PATENTS 3,015,128  1/1962  Somerville et al. _____ 18—2.6
3,231,639  1/1966  Mabru _____ 18—2.6 X J. SPENCER OVERHOLSER, *Primary Examiner.*

W. L. McBAY, *Assistant Examiner.*